United States Patent
Lehtonen et al.

(10) Patent No.: US 10,519,844 B2
(45) Date of Patent: Dec. 31, 2019

(54) HEAT INSULATION STRUCTURE

(71) Applicant: Wärtsilä Finland Oy, Vaasa (FI)

(72) Inventors: Pasi Lehtonen, Vaasa (FI); Christer Nygård, Vaasa (FI); Robert Lundström, Vaasa (FI); Heikki Suurholma, Vaasa (FI); Juha Hakala, Vaasa (FI); Juha Niemi, Vaasa (FI); Arto Aho, Vaasa (FI); Georg Eriksson, Vaasa (FI); Osmo Suomivirta, Vaasa (FI)

(73) Assignee: WÄRTSILÄ FINLAND OY, Vaasa (FI)

( * ) Notice: Subject to any disclaimer, the term of this patent is extended or adjusted under 35 U.S.C. 154(b) by 1 day.

(21) Appl. No.: 15/775,225

(22) PCT Filed: Nov. 18, 2015

(86) PCT No.: PCT/FI2015/050801
§ 371 (c)(1),
(2) Date: May 10, 2018

(87) PCT Pub. No.: WO2017/085353
PCT Pub. Date: May 26, 2017

(65) Prior Publication Data
US 2018/0328254 A1    Nov. 15, 2018

(51) Int. Cl.
*F01N 3/02* (2006.01)
*F01N 13/10* (2010.01)
(Continued)

(52) U.S. Cl.
CPC ......... *F01N 13/102* (2013.01); *F01N 13/004* (2013.01); *F01N 13/143* (2013.01);
(Continued)

(58) Field of Classification Search
CPC .... F01N 13/004; F01N 13/102; F01N 13/143; F02B 37/02

USPC ........................................................... 60/321
See application file for complete search history.

(56) References Cited

U.S. PATENT DOCUMENTS

| 7,234,302 B2* | 6/2007 | Korner ................... F01D 9/026 285/41 |
| 2004/0109759 A1 | 6/2004 | Korner |

(Continued)

FOREIGN PATENT DOCUMENTS

| DE | 20 37 135 A1 | 9/1971 |
| EP | 1 426 557 A1 | 6/2004 |

(Continued)

OTHER PUBLICATIONS

International Search Report (PCT/ISA/210) dated May 10, 2016, by the European Patent Office as the International Searching Authority for International Application No. PCT/FI2015/050801.

(Continued)

*Primary Examiner* — Jason D Shanske
(74) *Attorney, Agent, or Firm* — Buchanan Ingersoll & Rooney PC

(57) ABSTRACT

The heat insulation structure for a component of an exhaust system of a piston engine is arrangeable around the component such that an air space is formed between the component and the heat insulation structure, and includes an outer shell layer a middle shell layer that is arranged inside the outer shell layer, and a first inner shell layer that is arranged inside the middle shell layer. A first air gap is arranged between the outer shell layer and the middle shell layer, a first insulation layer is arranged between the middle shell layer and the first inner shell layer, and the outer shell layer is provided with venting apertures for natural ventilation of the first air gap.

11 Claims, 2 Drawing Sheets

(51) Int. Cl.
*F01N 13/00* (2010.01)
*F01N 13/14* (2010.01)
*F02B 37/02* (2006.01)

(52) U.S. Cl.
CPC .......... *F02B 37/02* (2013.01); *F01N 2260/08* (2013.01); *F01N 2260/20* (2013.01); *F01N 2310/02* (2013.01); *F01N 2340/06* (2013.01); *F01N 2590/02* (2013.01); *Y02T 10/144* (2013.01)

(56) References Cited

U.S. PATENT DOCUMENTS

2011/0162358 A1\* 7/2011 Bruck ................ B01D 53/9477
60/605.1
2014/0065331 A1\* 3/2014 Ridolfi .................. F01N 13/148
428/34.1

FOREIGN PATENT DOCUMENTS

FR 2 314 844 A1 1/1977
GB 2 045 859 A 11/1980

OTHER PUBLICATIONS

Written Opinion (PCT/ISA/237) dated May 10, 2016, by the European Patent Office as the International Searching Authority for International Application No. PCT/FI2015/050801.
International Preliminary Report on Patentability (PCT/IPEA/409) dated Oct. 20, 2017, by the European Patent Office as the International Preliminary Examining Authority for International Application No. PCT/FI2015/050801.

\* cited by examiner

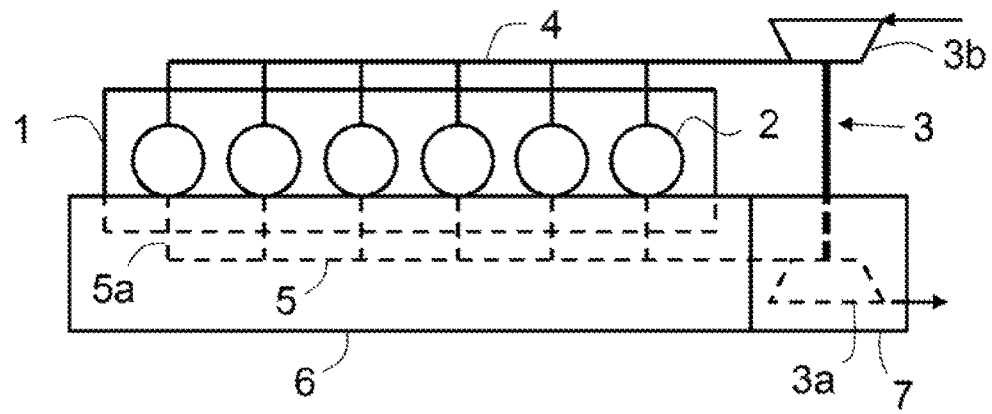
FIG. 1
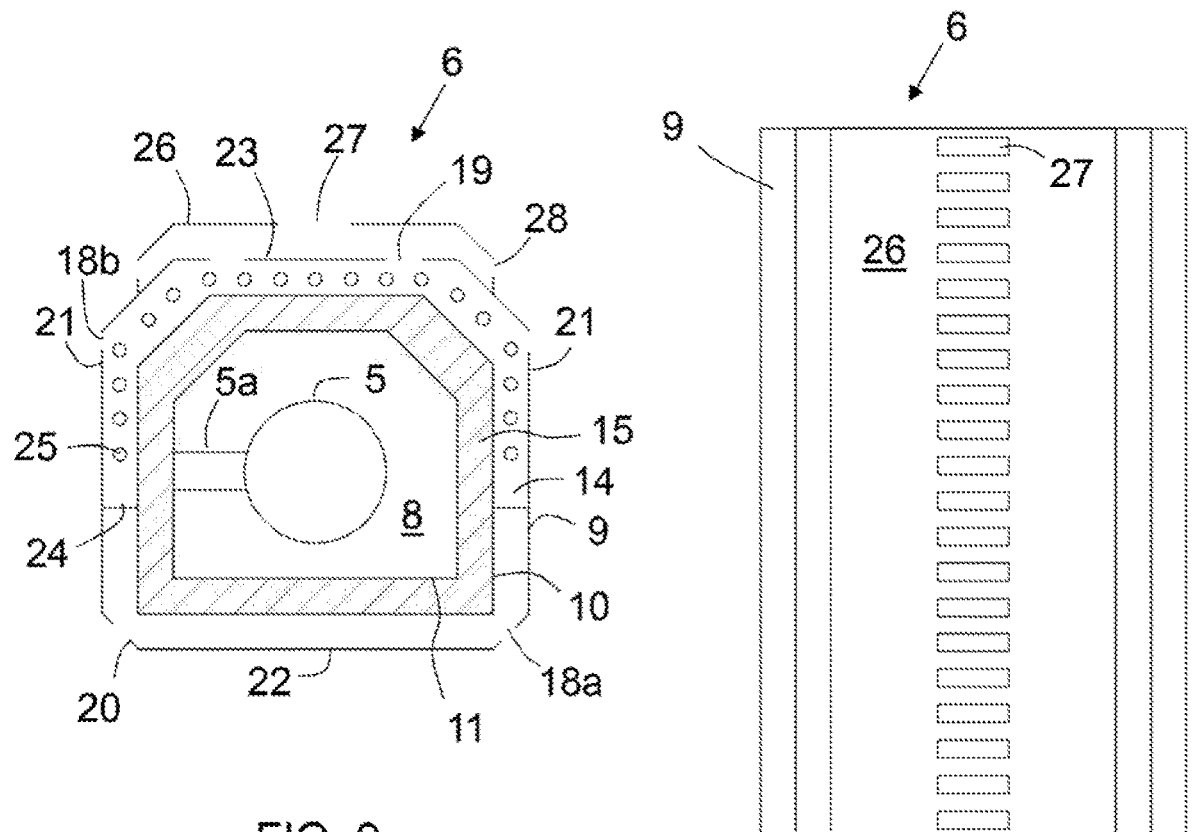
FIG. 2
FIG. 3

HEAT INSULATION STRUCTURE

TECHNICAL FIELD OF THE INVENTION

The present invention relates to a heat insulation structure for a component of an exhaust system of a piston engine as defined in claim 1.

BACKGROUND OF THE INVENTION

Many different treaties, such as the International Convention for the Safety of Life at Sea (SOLAS), set minimum safety standards for the construction, equipment and operation of ships. Many of the standards concern the construction of the engines used in the ships. The requirements set by the major treaties can be fulfilled with conventional constructions, but in some cases the use or the operating conditions of a ship set requirements that are much more difficult to meet. One aspect that is regulated by SOLAS and concerns engines is the surface temperature of the exhaust system. The requirements of SOLAS can be met by a single insulation layer arranged around an exhaust gas receiver and a turbocharger, but in some cases much lower surface temperatures need to be achieved.

SUMMARY OF THE INVENTION

An object of the present invention is to provide an improved heat insulation structure for a component of an exhaust system of a piston engine. The characterizing features of the heat insulation structure according to the invention are given in claim 1.

The heat insulation structure according to the invention is arrangeable around a component of an exhaust system in such a manner that an air space is formed between the component and the heat insulation structure and comprises an outer shell layer, a middle shell layer that is arranged inside the outer shell layer, and a first inner shell layer that is arranged inside the middle shell layer, wherein a first air gap is arranged between the outer shell layer and the middle shell layer, a first insulation layer of insulation material is arranged between the middle shell layer and the first inner shell layer, and the outer shell layer is provided with venting apertures for natural ventilation of the first air gap.

With the heat insulation structure according to the invention, the surface temperatures of the heat insulation structure are significantly reduced compared to conventional heat insulation structures used in the exhaust systems of piston engines. Low surface temperature can be achieved without fans or additional insulation layers outside the outer shell layer.

According to an embodiment of the invention, a lower part of the outer shell layer is provided with at least one air inlet for introducing venting air into the first air gap. An upper part of the outer shell layer can be provided with air outlets for releasing venting air from the first air gap. Air inlets in the lower part and air outlets in the upper part of the outer shell layer create an effective venting air flow through the first air gap keeping the surface temperature of the outer shell layer low.

According to an embodiment of the invention, the outer shell layer is provided with additional air inlets between the air inlets of the lower part and the air outlets. The additional air inlets enhance the ventilation of the first air gap.

According to an embodiment of the invention, a cover structure that is provided with venting apertures is arranged above the outer shell layer to cover the air outlets of the outer shell layer. The cover structure prevents fuel spillages on surfaces at higher temperatures.

According to an embodiment of the invention, the cover structure is provided with air outlets, which are arranged in a vertical direction above the air outlets of the outer shell layer. Due to the air outlets of the cover structure, the venting air can be released into the air immediately around the heat insulation structure. The location of the air outlets of the cover structure above the air outlets of the outer shell layer ensures that air flow through the first air gap is generated.

According to an embodiment of the invention, the air outlets of the cover structure are arranged in a horizontal direction in relation to the air outlets of the outer shell layer such that a labyrinth structure for the venting air is formed. The labyrinth structure generates better air flow through the first air gap. It also ensures that possible fuel spillages on the cover structure do not reach directly the hotter surfaces inside the heat insulation structure via the air outlets.

According to an embodiment of the invention, the cover structure is provided with air inlets, which are arranged in a vertical direction below the air outlets of the cover structure. The air inlets of the cover structure improve air flow in the heat insulation structure.

According to an embodiment of the invention, the heat insulation structure further comprises a second inner shell layer that is arranged inside the first inner shell layer, a third inner shell layer that is arranged inside the second inner shell layer, a second air gap that is arranged between the first inner shell layer and the second inner shell layer, and a second insulation layer of insulation material that is arranged between the second inner shell layer and the third inner shell layer. The further air gap and insulation layer improve the heat insulation. This heat insulation structure is suitable in particular for a turbine of a turbocharger. If the engine is provided with two-stage turbocharging, especially the high-pressure turbocharger may need an improved heat insulation structure with two air gaps and insulation layers.

According to an embodiment of the invention, the second air gap is provided with at least one air inlet for introducing air into the second air gap and connected to a flow channel that is arranged to convey air away from the second air gap. The temperature in the second air gap may be high, and therefore the air is preferably conveyed from the second air gap to a location, which is not exposed to possible sprays of flammable fluids.

According to an embodiment of the invention, the heat insulation structure comprises a cover structure that is arranged above the outer shell layer to cover air outlets of the outer shell layer and the flow channel connects the second air gap to a space between the outer shell layer and the cover structure. The air from both air gaps can thus be conveyed to the same place.

The insulation material can be for example mineral wool, such as rock wool.

An exhaust system according to the invention comprises a heat insulation structure defined above arranged around a component of the exhaust system. The component of the exhaust system can be an exhaust gas receiver or a turbine of a turbocharger.

A piston engine according to the invention comprises an exhaust system and a heat insulation structure defined above.

BRIEF DESCRIPTION OF THE DRAWINGS

Embodiments of the invention are described below in more detail with reference to the accompanying drawings, in which FIG. 1 shows schematically a piston engine and an exhaust system, FIG. 2 shows a simplified cross-sectional view of a heat insulation structure for an exhaust gas receiver, FIG. 3 shows a top view of the heat insulation structure of FIG. 2.

DESCRIPTION OF EMBODIMENTS OF THE INVENTION

Figure 4:
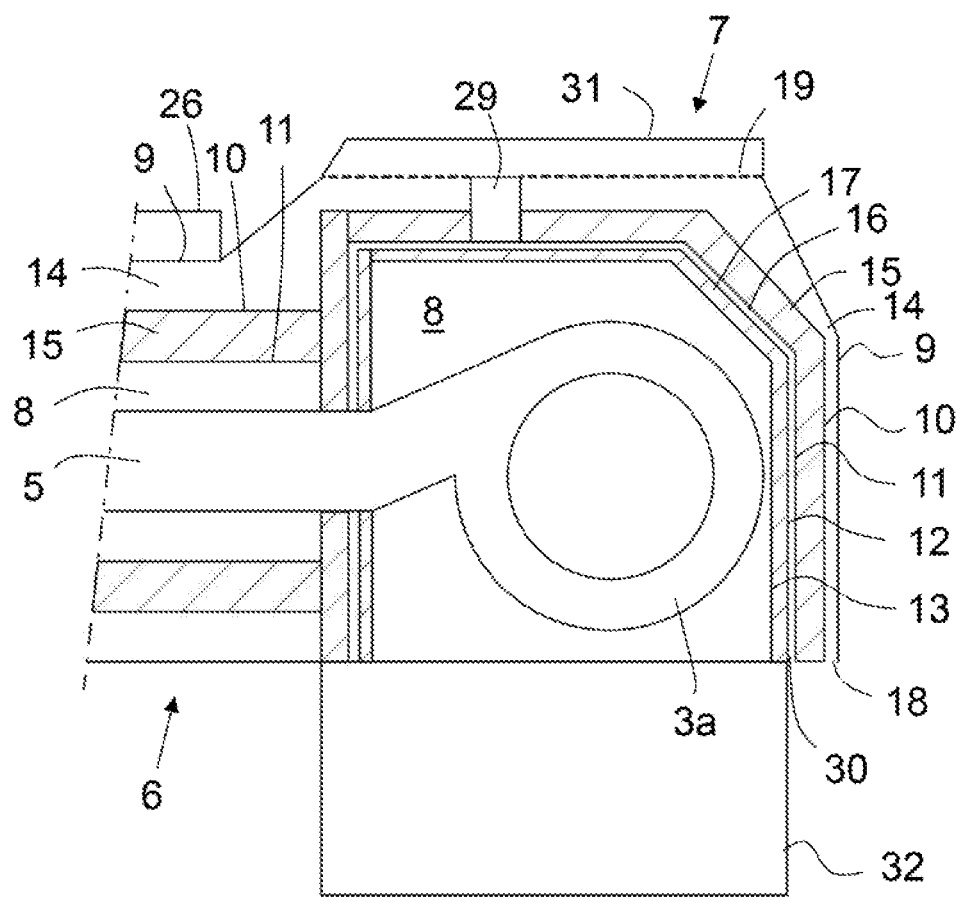
FIG. 4 shows a cross-sectional view of a heat insulation structure for a turbine of a turbocharger.

In FIG. 1 is shown schematically a piston engine 1 together with an intake system and an exhaust system. The engine 1 is a large internal combustion engine, such as a main or an auxiliary engine of a ship. The rated power of the engine 1 is at least 150 kW per cylinder and the cylinder bore is at least 150 mm. In the embodiment of FIG. 1, the engine 1 comprises six cylinders 2, but the engine 1 could comprise any reasonable number of cylinders 2, such as 4 to 24 cylinders 2. In the embodiment of FIG. 1, the cylinders 2 are arranged in line, but the cylinders 2 could also be, for instance, in a V-configuration.

The engine 1 is provided with a turbocharger 3 comprising a turbine 3a and a compressor 3b. The engine 1 could also be provided with two or more turbochargers 3. The turbochargers 3 could be arranged in series and/or in parallel. For instance, a V-engine could comprise one or two turbochargers for each bank of the engine. The turbine 3a of the turbocharger 3 forms part of the exhaust system of the engine 1, and the compressor 3b of the turbocharger 3 forms part of the intake system of the engine 1. From the compressor 3b of the turbocharger 3 the pressurized intake air is introduced into an intake duct 4, which conveys the intake air into the cylinders 2 of the engine 1. The exhaust system of the engine 1 comprises an exhaust gas receiver 5. The exhaust gas receiver 5 comprises a number of branches 5a. Each branch 5a of the exhaust gas receiver 5 is connected to a cylinder 2 of the engine 1 for receiving exhaust gases. The exhaust gas receiver 5 is connected to the turbine 3a of the turbocharger 3 for introducing the exhaust gases into the turbine 3a.

Because of the high temperature of the exhaust gases, the engine 1 is provided with a heat insulation arrangement that is arranged around the exhaust system of the engine 1. The heat insulation arrangement comprises a first heat insulation structure 6 that is arranged around the exhaust gas receiver 5 and a second heat insulation structure 7 that is arranged around the turbine 3a of the turbocharger 3.

FIG. 2 shows a cross-sectional view of the first heat insulation structure 6 and FIG. 3 shows a top view of the first heat insulation structure 6. The first heat insulation structure 6 is arranged around the exhaust gas receiver 5 such that an air space 8 is formed between the exhaust gas receiver 5 and the first heat insulation structure 6. The first heat insulation structure 6 comprises an outer shell layer 9, a middle shell layer 10 that is arranged inside the outer shell layer 9 and a first inner shell layer 11 that is arranged inside the middle shell layer 10. The middle shell layer 10 is at a distance from the outer shell layer 9 such that a first air gap 14 is formed between the outer shell layer 9 and the middle shell layer 10. The first inner shell layer 11 is at a distance from the middle shell layer 10 such that a first insulation layer 15 can be arranged between the middle shell layer 10 and the first inner shell layer 9. The first insulation layer 15 is made of non-liquid and non-gaseous insulation material. The insulation material can be, for instance, mineral wool, such as rock wool. The outer shell layer 9, the middle shell layer 10 and the first inner shell layer 11 can be made, for instance, of a sheet metal.

The first air gap 14 is naturally ventilated. The ventilation is thus based on differences in the density of air, and no fans are needed for circulating air in the first air gap 14. For the ventilation of the first air gap 14, the outer shell layer 9 is provided with venting apertures 18a, 18b, 19. Air inlets 18a are arranged in a lower part of the first heat insulation structure 6 and air outlets 19 are arranged in an upper part of the first heat insulation structure 6. Additional air inlets 18b are arranged in the side walls 21 of the outer shell layer 9. The additional inlets 18b are thus between the air outlets 19 and the air inlets 18a of the lower part of the first heat insulation structure 6. The air is introduced into the first air gap 14 via the air inlets 18a, 18b. The air is taken from the engine room immediately around the first heat insulation structure 6. In the embodiment of FIG. 2, the first heat insulation structure 6 comprises inclined sections 20, which connect the side walls 21 of the heat insulation structure 6 to the bottom 22 of the heat insulation structure 6. The air inlets 18 in the lower part of the first heat insulation structure 6 are arranged in the inclined sections 20 on both sides of the heat insulation structure 6. Each side of the first heat insulation structure 6 comprises a plurality of air inlets 18a, 18b, which are arranged along the construction.

In the embodiment of FIG. 2, the air outlets 19 are arranged in a top plate 23 of the first heat insulation structure 6. The air outlets 19 are arranged at a distance from the longitudinal center line of the heat insulation arrangement. The heat insulation structure 6 of FIG. 2 comprises two rows of air outlets 19, one row being arranged on each side of the longitudinal center line of the heat insulation structure 6. The first heat insulation structure 6 is further provided with partition walls 24, which divide the first air gap 14 into compartments in the longitudinal direction of the heat insulation structure 6. The partition walls 24 are provided with apertures 25, which allow air flow between the compartments. However, because both the air inlets 18a, 18b and the air outlets 19 are arranged at regular intervals along the longitudinal direction of the first heat insulation structure 6, the flow direction of the air within the first air gap 14 is mainly from the bottom of the first heat insulation structure 6 towards the top of the heat insulation structure 6. This helps to keep the surface temperature of the outer shell layer 9 steady.

The first heat insulation structure 6 is further provided with a cover structure 26. The cover structure 26 is arranged above the outer shell layer 9 and covers the air outlets 19 of the outer shell layer 9. Also the cover structure 26 is provided with venting apertures 27, 28. Air outlets 27 are arranged on top of the cover structure 26. The air outlets 27 of the cover structure 26 are in a vertical direction above the air outlets 19 of the outer shell layer 9. The air outlets 27 of the cover structure 26 are arranged in a horizontal direction in such a way in relation to the air outlets 19 of the outer shell layer 9 that a labyrinth structure for the venting air is formed. The construction of the cover structure 26 enhances air flow through the first air gap 14 and also prevents fuel spillages on the surfaces at higher temperatures. Air inlets 28 are arranged on both sides of the cover structure 26. The air inlets 28 are below the air outlets 27 of the cover structure 26 in a vertical direction. Also the air inlets 28 of the cover structure 26 enhance air flow in the first heat insulation structure 6. In the embodiment of FIG. 2, the air from the first air gap 14 is released into the air immediately around the first heat insulation structure 6.

In FIG. 4 is shown a cross-sectional view of a second heat insulation structure 7, which is arranged around a turbine 3a of a turbocharger 3. The second heat insulation structure 7 is connected to the first heat insulation structure 6. The construction of the second heat insulation structure 7 is similar to the construction of first heat insulation structure 6. However, due to the high temperature in the turbine 3a of the turbocharger 3, the second heat insulation structure 7 is provided with additional layers. Also the second heat insulation structure 7 comprises an outer shell layer 9, a middle shell layer 10 that is arranged inside the outer shell layer 9 and a first inner shell layer 11 that is arranged inside the middle shell layer 10. The middle shell layer 10 is at a distance from the outer shell layer 9 such that a first air gap 14 is formed between the outer shell layer 9 and the middle shell layer 10. The first inner shell layer 11 is at a distance from the middle shell layer 10 such that a first insulation layer 15 can be arranged between the middle shell layer 10 and the first inner shell layer 9. The first insulation layer 15 is made of non-liquid and non-gaseous insulation material. The insulation material can be, for instance, mineral wool, such as rock wool. A second inner shell layer 12 is arranged inside the first inner shell layer 11 and a third inner shell layer 13 is arranged inside the second inner shell layer 12. The second inner shell layer 12 is at a distance from the first inner shell layer 11 and the third inner shell layer 13 is at a distance from the second inner shell layer 12. A second air gap 16 is formed between the first inner shell layer 11 and the second inner shell layer 12. A second insulation layer 17 is formed between the second inner shell layer 12 and the third inner shell layer 13. The insulation material used for the second insulation layer 17 can be the same as the material used for the first insulation layer 15. The outer shell layer 9, the middle shell layer 10 and the inner shell layers 11, 12, 13 can be made, for instance, of a sheet metal.

In the embodiment of FIG. 4, the second heat insulation structure 7 does not encircle the turbine 3a of the turbocharger 3 completely. Since the turbocharger 3 is arranged on a turbocharger bracket 32, heat insulation below the turbine 3a does not need to be as effective as on the other sides of the turbine 3a. Below the turbine 3a, a single layer of insulation material may be sufficient. However, the second heat insulation structure 7 could encircle the turbine 3a of the turbocharger 3 on all sides. In the embodiment of FIG. 4, the bottom of the outer shell layer 9 of the second heat insulation structure 7 is open. An air inlet 18 for introducing air into the first air gap 14 is thus formed in the bottom of the second heat insulation structure 7. Instead of or in addition to the air inlet 18 in the bottom of the second heat insulation structure 7, air inlets could also be arranged in the side wall of the outer shell layer 9 in a lower part of the second heat insulation structure 7. The outer shell layer 9 is also provided with air outlets 19 in an upper part of the second heat insulation structure 7. Also the first air gap 14 of the second heat insulation structure 7 is naturally ventilated.

The second heat insulation structure 7 further comprises a cover structure 31, which is arranged above the outer shell layer 9. The cover structure 31 covers the air outlets 19 of the outer shell layer 9. Contrary to the cover structure 26 of the first heat insulation structure 6, the cover structure 31 of the second heat insulation structure 7 is not provided with air inlets and air outlets. Instead, the cover structure 31 of the second heat insulation structure 7 is connected to a flow channel, which conveys the air away from the space between the outer shell layer 9 and the cover structure 31. The hot air is thus not released to the air in the proximity of the second heat insulation structure 7, but conveyed to a location where the air is not exposed to flammable fluids.

Also the second air gap 16 is provided with at least one air inlet 30, which is arranged in the bottom of the second heat insulation structure 7. An upper part of the second air gap 16 is connected to a flow channel 29, through which air can be conveyed out of the second air gap 16. Also the second air gap 16 is naturally ventilated. The flow channel 29 is connected to the space between the outer shell layer 9 and the cover structure 31. The air from the second air gap 16 is thus mixed with the air from the first air gap 14 and conveyed away from the proximity of the heat insulation arrangement.

It will be appreciated by a person skilled in the art that the invention is not limited to the embodiments described above, but may vary within the scope of the appended claims.

The invention claimed is:

1. A heat insulation structure for a component of an exhaust system of a piston engine, the heat insulation structure being configured to be arrangeable around the component of the exhaust system in such a manner that an air space will be formed between the component and the heat insulation structure during use, the heat insulation structure comprising:
   an outer shell layer;
   a middle shell layer that is arranged inside the outer shell layer; and
   a first inner shell layer that is arranged inside the middle shell layer;
   wherein a first air gap is arranged between the outer shell layer and the middle shell layer;
   a first insulation layer of insulation material is arranged between the middle shell layer and the first inner shell layer;
   the outer shell layer is provided with venting apertures for natural ventilation of the first air gap, the venting apertures having air outlets, which are arranged in an upper part of the outer shell layer for releasing venting air from the first air gap; and
   a cover structure that is provided with venting apertures arranged above the outer shell layer to cover the air outlets of the outer shell layer, the venting apertures of the cover structure having air outlets, which are arranged in a vertical direction above the air outlets of the outer shell layer, and the venting apertures of the cover structure having air inlets, which are arranged in a vertical direction below the air outlets of the cover structure.

2. The heat insulation structure according to claim 1, wherein the venting apertures of the outer shell layer comprise:
   at least one air inlet, which is arranged in a lower part of the outer shell layer for introducing venting air into the first air gap.

3. The heat insulation structure according to claim 2, wherein the venting apertures of the outer shell layer comprise:
   additional air inlets between the air inlets of the lower part and the air outlets.

4. The heat insulation structure according to claim 1, wherein the air outlets of the cover structure are arranged in a horizontal direction in relation to the air outlets of the outer shell layer such that a labyrinth structure for the venting air is formed.

5. The heat insulation structure according to claim 1 comprising:

a second inner shell layer that is arranged inside the first inner shell layer; a third inner shell layer that is arranged inside the second inner shell layer;

a second air gap that is arranged between the first inner shell layer and the second inner shell layer; and a second insulation layer of insulation material that is arranged between the second inner shell layer and the third inner shell layer.

6. The heat insulation structure according to claim 5, wherein the second air gap is provided with at least one air inlet for introducing air into the second air gap and connected to a flow channel that is arranged to convey air away from the second air gap.

7. The heat insulation structure according to claim 1, wherein the insulation material is rock wool or other mineral wool.

8. An exhaust system for a piston engine, wherein the exhaust system comprises in combination with:

a component; and the heat insulation structure according to claim 1 arranged around the component of the exhaust system.

9. The exhaust system according to claim 8, wherein the component of the exhaust system is an exhaust gas receiver.

10. The exhaust system according to claim 8, wherein the component of the exhaust system is a turbine of a turbocharger.

11. A piston engine comprising:

an exhaust system; and the heat insulation structure according to claim 1.

* * * * *